United States Patent
Eby

[15] 3,706,882
[45] Dec. 19, 1972

[54] EMERGENCY SIGNAL LIGHT WITH MAGNETIC CONTACTS

[72] Inventor: George W. Eby, 1614 Pierce Street, Oregon City, Oreg. 97045

[22] Filed: Feb. 23, 1971

[21] Appl. No.: 117,969

[52] U.S. Cl.................240/7.1 R, 240/8.18, 339/10, 339/12 L
[51] Int. Cl........B60q 1/24, H01r 11/30, H01r 33/00
[58] Field of Search...........339/10, 12 R, 12 V, 12 L; 240/7.1 R, 8.18, 52.15

[56] References Cited

UNITED STATES PATENTS

| | | | |
|---|---|---|---|
| 3,144,527 | 8/1964 | Tolegian | 339/12 L X |
| 2,069,238 | 2/1937 | Fraser | 240/7.1 R |
| 3,038,139 | 6/1962 | Bonanno | 339/12 R |
| 3,439,159 | 4/1969 | McRoskey et al. | 240/8.18 |

FOREIGN PATENTS OR APPLICATIONS 1,111,697   11/1955   France................339/12 L Primary Examiner—S. Clement Swisher
Assistant Examiner—Frederick Shoon
Attorney—Berman, Davidson & Berman

[57] ABSTRACT

An auto lamp assembly having a base of insulating material to the bottom of which is attached a pair of spaced permanent magnets wired to the respective terminals of the associated lamp. The magnets are used as contacts engagable with spaced contact plates of magnetic material insulatingly mounted on a portion of an automobile and connected to the automobile battery, so that the lamp can become energized when the magnets engage the contact plates and also be supported by the magnets.

2 Claims, 3 Drawing Figures

PATENTED DEC 19 1972

3,706,882

INVENTOR.
GEORGE W. EBY,
BY
Berman, Davidson & Berman,
ATTORNEYS.

EMERGENCY SIGNAL LIGHT WITH MAGNETIC CONTACTS

This invention relates to emergency electric lamp assemblies, and more particularly to an emergency signal lamp assembly, especially adapted to be employed with an automobile or similar motor vehicle.

A main object of the invention is to provide an improved signal lamp assembly for automobiles or similar vehicles, the assembly being simple in construction, being very compact in size, and being adapted to employ the battery of the associated vehicle, so that the assembly is not required to provide its own energy source.

A further object of the invention is to provide an improved signal lamp assembly which can be employed in an emergency, for example, by police vehicles or similar emergency vehicles, and which does not require its own battery but which is adapted to be energized from the battery of the associated vehicle and which employs magnetic supporting elements which also serve as contacts for energizing the lamp of the assembly.

A still further object of the invention is to provide an improved electric lamp assembly for use as an emergency lamp, the assembly being inexpensive to manufacture, being durable in construction, being each to mount, and being so arranged that it can be instantly used by being engaged with cooperating contact plates provided on the associated vehicle.

Further objects and advantages of the invention will become apparent from the following description and claims, and from the accompanying drawings, wherein:

Figure 1:
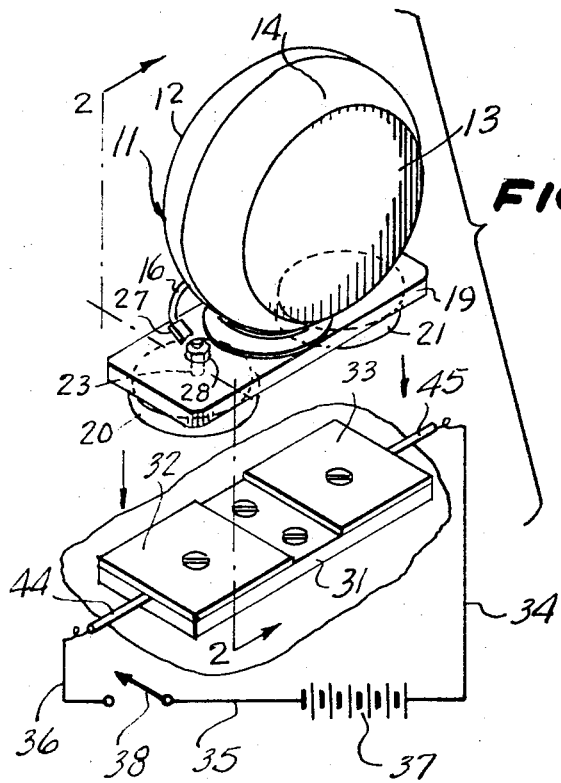
FIG. 1 is a perspective view of an improved signal lamp assembly constructed in accordance with the present invention shown with the cooperating vehicle-mounted contacts, the electrical circuit associated with said contacts being shown schematically.
Figure 2:
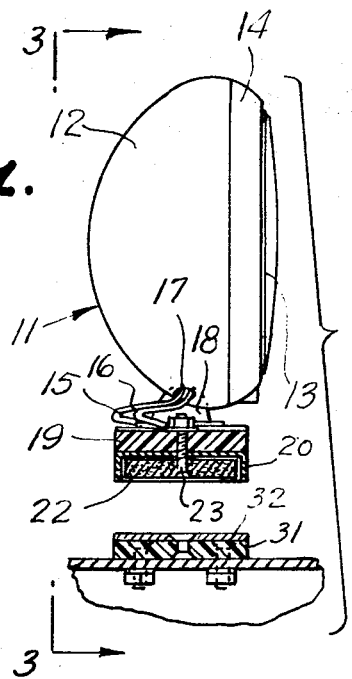
FIG. 2 is an enlarged transverse vertical cross-sectional view taken substantially on the line 2—2 of FIG. 1.

Referring to the drawings, 11 generally designates an electric lamp assembly constructed in accordance with the present invention, said assembly comprising a suitable generally circular, spherically curved housing 12 in which is mounted a conventional lamp assembly, such as a sealed beam lamp assembly 13, the lens portion thereof facing outwardly and being surrounded by a marginal rim 14. Mounted in the housing 12 is a conventional socket (not shown) which receives the base of the lamp 13, and which is provided with a a pair of lead wires 15 and 16 extending from a bottom opening 17 of housing 12. The housing itself is rigidly mounted by means of a supporting neck 18 on a rectangular plate member of rigid insulating material, such as molded plastic material.

Designated at 20 and 21 are respective metal cup members which are secured to the insulating plate member 19 on opposite sides of the neck member 18 and which face downwardly, said cup members having secured therein respective permanent magnets 22, the cup members and magnets being centrally secured by means of terminal bolts 23, 24 to the insulating plate member 19. The respective lamp terminal wires 15 and 16 are connected to the terminal bolts 23 and 24, said terminal wires being provided with conventional connection lugs 27 and being clamped to the bolts 23 and 24 by clamping nuts 28.

The associated vehicle has mounted thereon at any convenient portion, such as on its dashboard cowling adjacent the vehicle windshield or on an interior portion of the vehicle body adjacent the rear view window thereof, a plate member 31 of insulating material on which is secured a pair of spaced metal plates of magnetic material, such as steel or the like, shown at 32 and 33. The metal plates 32 and 33 have the same spacing as the cup members 20, 21 of the lamp assembly 11, providing a means whereby the lamp assembly may be supportingly engaged therewith and held thereto by magnetic attraction. The plate members 32 and 33 are connected by suitable wires, shown at 34, 35 and 36 to the vehicle battery 37. A manually operated control switch 38 may be connected between the wires 35 and 36, as shown in FIG. 1. The control switch 38 may comprise any suitable switch means, for example, a blinker switch may be substituted therefor, to provide blinking action o the lamp assembly if so desired.

Figure 3:
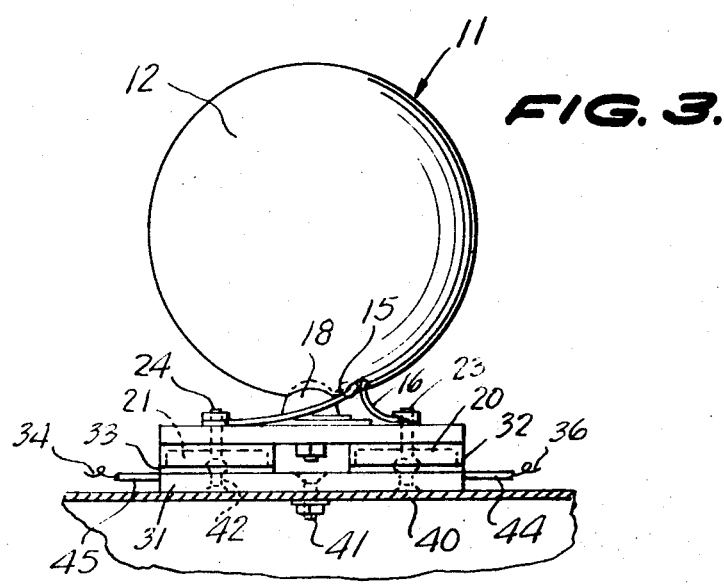
FIG. 3 is a vertical cross-sectional view taken substantially on the line 3—3 of FIG. 2, showing the lamp assembly in operating position and in conductive engagement with its associated energizing contact plates.

Referring to FIG. 3, it will be noted that the insulating plate 31 is secured to the metal wall 40 of the vehicle by central fastening bolt 41 and that the two contact plates 32 and 33 are secured to the insulating plate 31 by rivets 42 which are upwardly spaced sufficiently from the bottom surface of plate member 31 so as not to contact with wall 40. The plates 32 are provided with respective connection terminal pins 44 and 45 to which the respective wires 36 and 34 are connected. Thus, the plates 32 and 33 are normally completely insulated from each other.

When it is desired to display the emergency signal lamp and to energize same, the assembly 11 is placed over the contact plates 32 and 33 and the metal cups 20 and 21 are engaged with the respective contact plates 32 and 33, being held thereon by the magnetic attraction between the permanent magnets and the plates 32, 33. Electrical contacts are made by the rims of the cups 20, 21 which protrude slightly below the bottom surfaces of the permanent magnets 22. Thus, with the switch 38 closed, the lamp of the assembly 11 becomes energized, providing the desired visual emergency signal.

The device is especially adapted for use with unmarked police cars and with similar emergency vehicles wherein occasions arise when it is necessary to quickly display a highly visible signal. The supporting contact plates 32, 33 may be mounted at any desired location in the associated vehicle, as above described, either to support the lamp assembly 11 upside down or in an upright position, and to support the lamp assembly in a highly visible location, such as adjacent to the vehicle windshield or rear view window.

It will be noted that the assembly 11 is self-contained and is relatively compact in size, so that it may be stored in the vehicle in any convenient location, and may be quickly mounted in its intended operating position without requiring the use of tools and without requiring manipulation of any mechanical fasteners.

While the above description is directed to a magnetically supported emergency light, it will be apparent that the same magnetically operated contact arrangement may be used for supporting and energizing any other type of electrical device, such as a tape deck, an AM-FM radio, a 2-way radio, a defroster fan for automotive or marine equipment, or the like, so that such a device may be quickly and easily removed from the vehicle by the owner to prevent thievery.

While a specific embodiment of an improved emergency light unit for a vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An emergency lamp assembly comprising an insulating base, a lamp unit mounted on said base, a pair of spaced permanent magnet assemblies secured to the bottom of said base, said permanent magnet assemblies being adapted to engage similarly spaced contact members on an associated vehicle, and conductor means connecting said permanent magnet assemblies to the terminals of the lamp unit, wherein said base comprises a plate member of insulating material and said permanent magnet assemblies each comprises a metal cup member secured in downwardly facing position to the bottom of said last-named plate member, and a permanent magnet secured in each cup member, and wherein the bottom rims of the cup members extend downwardly slightly below the bottom planes of the associated permanent magnets.

2. In a vehicle, a source of current, spaced flat contact members mounted on said vehicle and being connected to said source of current, an electrical device having terminals spaced to engage said contact members, and means providing a magnetic force of attraction between said terminals and said contact members sufficient to retain said terminals in conductive engagement with said contact members until said device is manually separated from said contact member, wherein said contact members are of magnetic material and said attraction force-providing means comprises permanent magnets carried by said terminals, wherein said terminals comprise downwardly facing metal cup members conductively engageable at their rims with said contact members, said permanent magnets being mounted within said metal cup members, and wherein the bottom planes of the permanent magnets are spaced upwardly relative to the bottom planes of the rims of the metal cups member, whereby electrical contact is made only between the rims of the cup members and the contact members.

* * * * *